TIN BOO YEE
INVENTOR

TIN BOO YEE

INVENTOR

United States Patent Office 3,415,122
Patented Dec. 10, 1968

3,415,122
MAXIMUM TEMPERATURE INDICATING
CERAMIC FILM
Tin B. Yee, 209 Walker Ave. NE., Huntsville,
Ala. 35801
Filed Apr. 15, 1963, Ser. No. 273,229
2 Claims. (Cl. 73—356)

This invention relates to a maximum temperature indicating ceramic film, and more particularly to a ceramic film for the sensing and recording of high temperatures in the range from about 900° to 1400° C. under conditions where the ceramic film is subjected to the high temperatures for periods of several seconds or longer.

This invention is particularly adapted to the recording of the peak temperature reached on any part of the surface or sub-surface of the return rocket nose cone or any space vehicle during re-entry into the earth's atmosphere from outer space. When such nose cone or similar structure penetrates the atmosphere, there is friction between the air and the outer surface of the object, which produces tremendous amounts of heat. It is vitally important that the temperatures to which objects are heated on re-entry be measured accurately as an aid in the design of insulation for the protection of both rocket personnel and equipment and for other purposes.

Thermocouples can be used to record the high temperatures attained by the outer surface of the nose cones and space vehicles; however, these are objectionable because they occupy excessive space and, moreover, the shock of rocket take-off and return is damaging to the relatively fragile recording mechanisms employed therewith.

Figure 1:
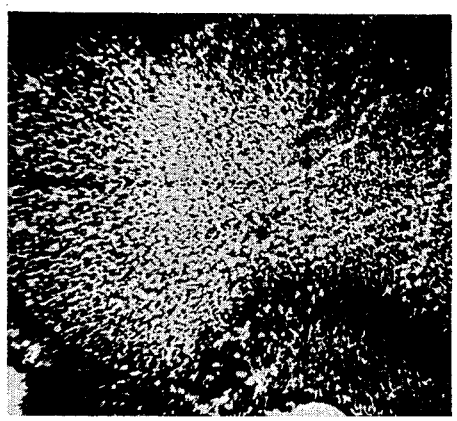
Figure 2:
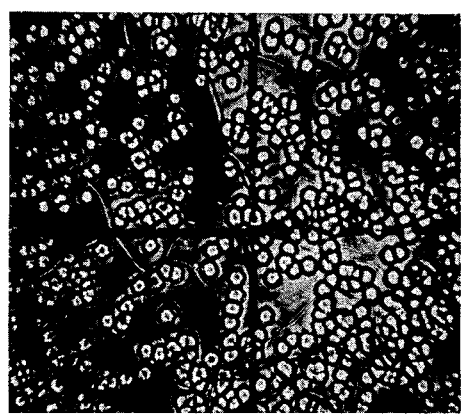
Figure 3:
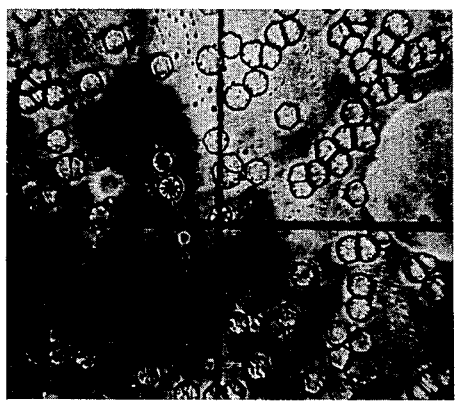
Figure 4:
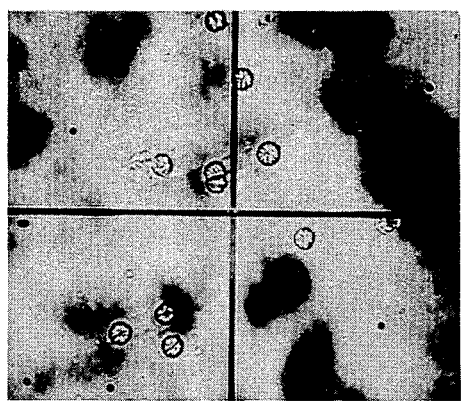
Figure 5:
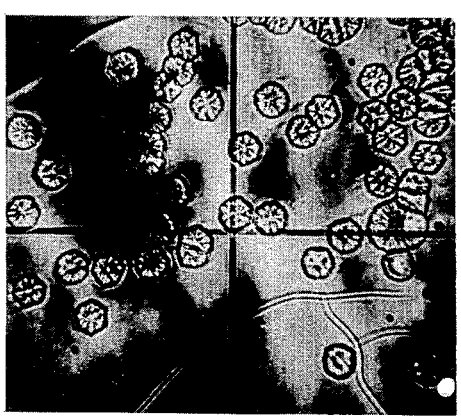
Figure 6:
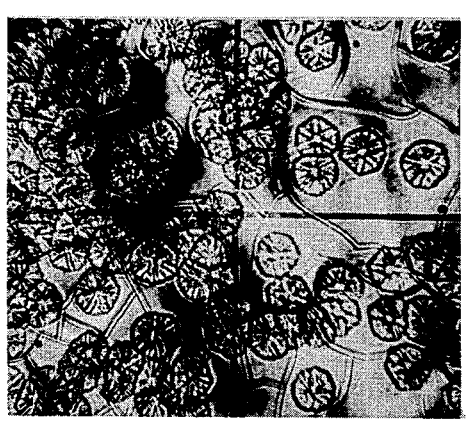
Figure 7:
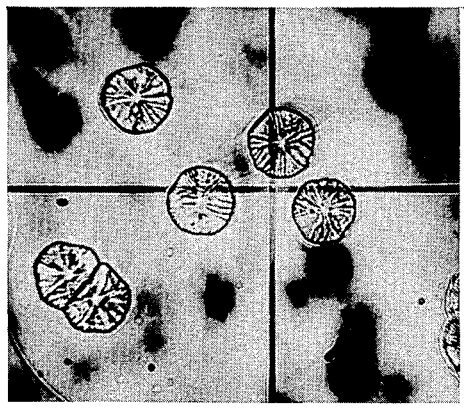
Figure 8:
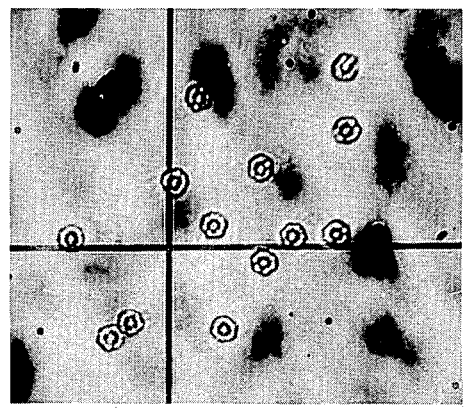
Figure 9:
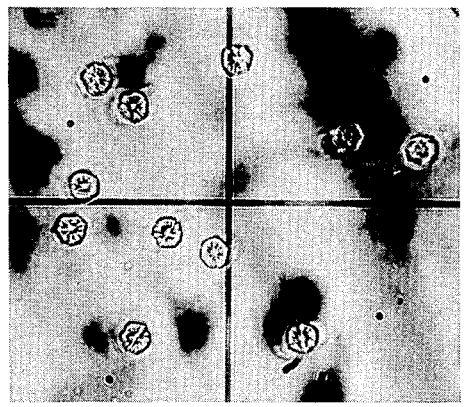
Figure 10:
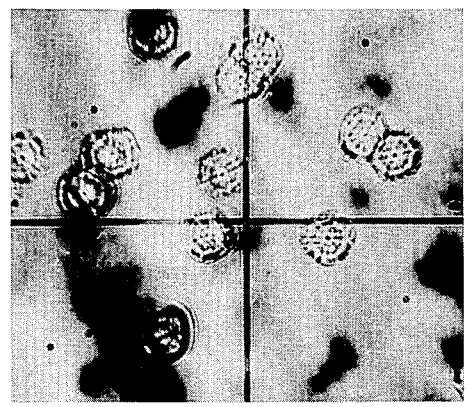
Figure 11:
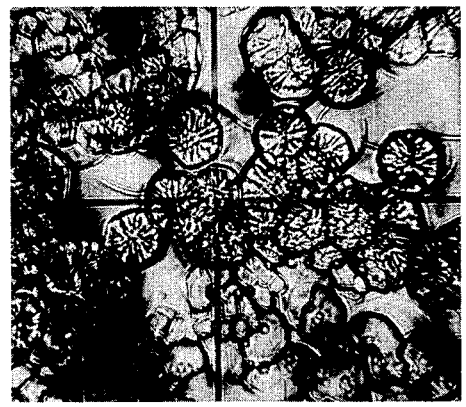

An object of this invention is the provision of an improved temperature indicator, one which is of low mass, and one which preserves an accurate and permanent record of the maximum temperature to which it has been exposed. Another object of this invention is the provision of a temperature of very high physical strength and shock resistance which is especially adapted to use in severe environments in the form of an exteriorly exposed sheath constituent during flights of guided missiles, rockets, and space vehicles generally. Yet another object of this invention is to provide a temperature indicator adapted to serve, in itself, as a protective sheath substance integral with the principal outside wall material of construction of which the object to be heated is composed. The manner in which these and other objects of this invention are attained will become apparent from the detailed description and the drawings, which are all photomicrographs (revealing the microscope cross hairs) taken with transmitted visible light at X300 magnification, as to which:

FIGS. 1, 2, and 3 show the crystal growth resulting from 30 seconds of heat exposure for three Series A films at 1000° C., 1050° C., and 1100° C., respectively.

FIGS. 4, 5, 6, and 7 show the crystal growth resulting from 30 seconds of heat exposure for four Series B films at 1100° C., 1150° C., 1200° C., and 1250° C., respectively.

FIGS. 8, 9, 10, and 11 show the crystal growth resulting from 30 seconds of heat exposure for four Series C films at 1250° C., 1300° C., 1350° C., and 1400° C., respectively.

Figure 12:
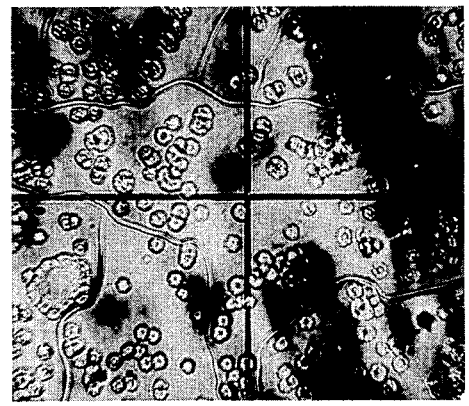
Figure 13:
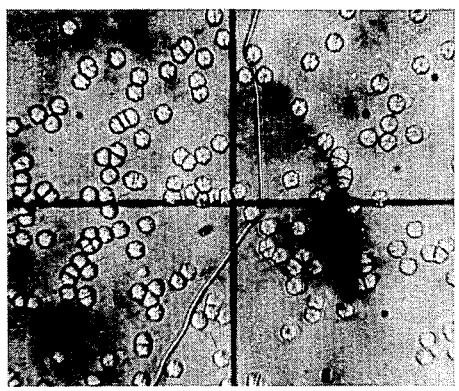
Figure 14:
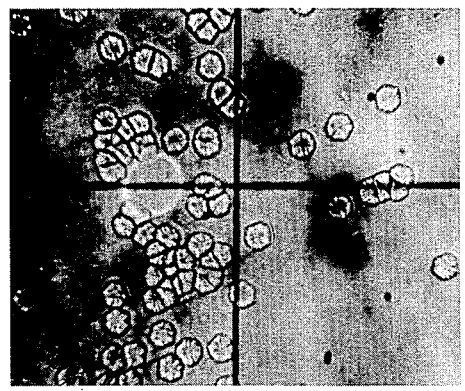
Figure 15:
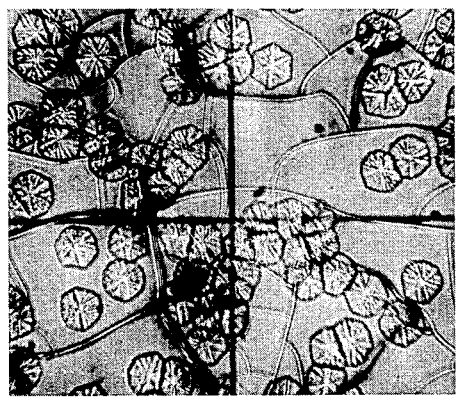
Figure 16:
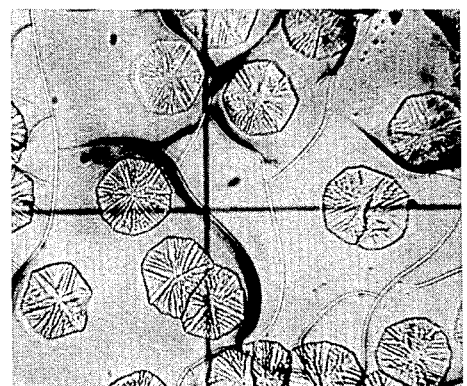

FIGURE 12 shows the crystal growth resulting from 15 seconds of heat exposure for a Series C film at 1400° C., and FIGS. 13, 14, 15, and 16 show the crystal growth resulting from 60 seconds of heat exposure for four Series B films at 900° C., 950° C., 1000° C., and 1050° C., respectively.

Figure 17:
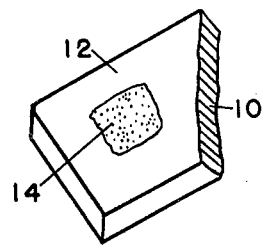

FIG. 17 shows a film on the surface of a refractory material.

Generally, this invention consists of an indicator for temperatures in the range of about 900° C. to about 1400° C., comprising an inorganic ceramic film consisting essentially of a prefused and solid state solution of cupric oxide-enriched porcelain enamel frit forming nuclei upon heating, followed by crystal growth as a unique function of exposure to environmental temperature in the course of a preselected time duration extending from several seconds to several minutes.

A relatively wide range of temperature evaluation is afforded by the use of the following two porcelain enamel frits having the following approximate composition, based on technical grade ingredients:

Frit No. 1: 50.4% quartz, 27.4% borax (dehydrated), 9.7% potassium silicofluoride, 6.9% soda niter, 4.0% monosodium orthophosphate (dehydrated), and 1.6% sodium silicofluoride.

Frit No. 1 is made up by intimately mixing the several ingredients and then smelting the batch in a gas-air-fired crucible smelter at a temperature of about 1200° C. for an hour, or until a smooth thread can be drawn from the melt. The molten frit is then chilled by pouring into cold water, after which the solid frit particles are dried and ground into a fineness permitting 100% passage through a No. 20 sieve.

Frit No. 2 is a lead-boro-silicate frit for aluminum. This is a commercial frit which can be bought in open market, e.g., Du Pont Co. No. N–360, or similar composition, such as that taught in U.S. Patents 2,467,114, 2,544,139, and 2,653,877. Frit No. 2 has a maturing temperature of about 500° C. At temperatures above 900° C., Frit No. 2 has a much lower viscosity than Frit No. 1. Frit No. 2 is used to lower the viscosity of Frit No. 1. Crystals can grow in Frit No. 1 without Frit No. 2, but by adding Frit No. 2 to Frit No. 1, crystals can grow to larger size than in Frit No. 1 alone used at the same temperature.

The temperature indicators of this invention are typically fabricated in the following proportions, corresponding to the Series A, B, and C films shown in FIGS. 1, 2, 3, 4, and 5.

COMPOSITION OF THE FILMS BY WEIGHT

| Series | Percent cupric oxide | Percent Frit No. 1 | Percent Frit No. 2 |
|---|---|---|---|
| A | 30.0 | 50.0 | 20.0 |
| B | 20.0 | 60.0 | 20.0 |
| C | 14.3 | 85.7 | 0 |

The frits and cupric oxide are thoroughly mixed together with a mortar and pestle. About ten to fifteen grams of the mixture are placed in a 25 cubic centimeter capacity platinum crucible. The crucible with its contents is then placed in a small upright muffle furnace of about two and half inches inside diameter, and about four inches inside height. A plug with a small hole about half on an inch in diameter is placed over the mouth of the furnace. The temperature of the furnace is then raised until the mixture melts, go into chemical solution, the temperature level at this point being typically about from 950° C. to 1095° C., depending on the mixtures of the melt. The temperatures at which each melt can typically be held during the bubble blowing are as follows: For Series A, between 945° C. and 970° C.; for Series B, between 945° C. and 980° C.; and for Series C, between 1075° C. and 1095° C. The melt is held at this temperature for about half of an hour in order to insure a consistency permitting the blowing of bubbles. A platinum tube of 90% platinum and 10% rhodium about ⅛″ inside diameter and about 10″ long, is used as a blowpipe. One end of the tube is connected to a piece of rubber tubing, placed in the mouth for blowing. The other end of the tube is dipped just below the surface of the melt in the furnace and is held there for several minutes so that the tube comes to a temperature approximating that of the melt. The tube is then quickly withdrawn from the furnace and a bubble blown gently, but quickly, to a size of an inch or more in diameter. The bubble usually bursts soon after it is formed. The thinnest section of the bubble is preferred for use as a temperature indicator according to this invention, a thickness of less than about 0.0001" giving good results. A satisfactory thin film shows a spectrum of color in daylight, indicating that it is not too thick.

For use as a temperature indicator-recorder, the ceramic film must be supported on a flat, smooth, polished surface of refractory material, such as a quartz slide. A supporting surface 10 of refractory material having a flat, smooth area 12 to which the ceramic film 14 is attached is shown in FIG. 17. The supporting piece of refractory material can be any convenient size, shape, and thickness. The area of the suporting piece can be as small as 0.1" square, and the thickness of the supporting piece can be about 0.01". The refractory material support can be either transparent, such as a quartz slide for use with a transmitted light microscope, or opaque for use with a reflected light microscope. The ceramic film can be attached to the surface of the support by heating the film in position on its support for about 45 seconds at a temperature below the nucleation and crystal growth temperature of that particular film, e.g. 600° C. In some cases it is desirable to employ a cover slide to protect the ceramic films. The cover slide should be transparent quartz slide of any convenient thickness, e.g., 0.01". The support and the cover slide can be held together by cement in such way that the cement does not interfere with observation of the ceramic film through a microscope. Two or more ceramic films of different compositions for measuring and recording the same temperature can be placed on the same support. Orderly mounting or other identification is necessary to permit the certain identification of each of the individual ceramic film.

For re-entry, the ceramic films of this invention are attached to any part of the space vehicle or nose cone for recording the temperature at that point during the re-entry. If the wall of the space vehicle or nose cone is made of glass fiber and plastic, the temperature indicator-recorders are placed in preselected position in the wall during the formation of the wall from the glass fiber and plastic. The temperature used in setting of the plastic-glass fiber composite will not affect the ceramic film. When the space vehicle or nose cone returns from outer space, part of the outer surface of the space vehicle or nose cone melts and peels away during the re-entry. This is of no consequence so long as some of the temperature indicator-recorders survive the return trip, so that a temperature record is preserved. The recovered temperature indicator-recorders are carefully cleaned and the surface of the cover slides is polished, if they are rough. The crystals developed on the support are then photomicrographed at the same magnification as the calibration photomicrographs. A set of calibration standards for each of the ceramic films of Series A, B, and C is shown in the figures. A comparison of crystal sizes between the temperature indicator-recorders and the calibration standards, which have been heat-treated the same number of seconds as the indicator-recorders furnishes the measure of the temperatures registered by the indicator-recorders.

The calibration standards are made up as follows: A small piece of ceramic film a few square millimeters in area is sufficient for each standard. The film is placed on a small quartz slide about ½" square and pressed down tightly with a piece of paper, so that the film lies flat upon the slide. The ceramic film can be made to adhere to the surface of the slide by heating the slide and the film for about 45 seconds at a temperature below the nucleation and crystal growth temperature of that particular film, e.g., 600° C. Quartz slides are transparent and photomicrographs of the crystals can be readily made with transmitted light using a conventional microscope. If the support for the ceramic film is opaque, reflected light must be used when photomicrographing the crystals. The quartz slides are capable of withstanding as high as 1500° C. for short periods of time, permitting controlled crystal growth by exposure to furnace temperatures. A thermocouple is conveniently used as a holder for the slide with the ceramic film in place on it. The junction of the thermocouple is bent in such way so that it is touching the upper side of the slide. The part of the thermocouple near the junction is bent to form a support retaining the slide and ceramic film securely in place. The temperature in the furnace is maintained constant at the calibration level. The opening of the furnace is preferably blocked with a thick piece of insulation brick having a hole therein just large enough to receive the slide with its film mount together with the thermocouple. The temperatures of exposure are read with the aid of a conventional thermocouple indicator or recorder. After the slide with its film has been exposed to furnace temperature for a given time (e.g., 30 seconds) the slide is withdrawn and cooled in the air, whereupon, the final size of the crystals attained during the furnace exposure is preserved as a standard.

Calibration is accomplished as follows for each kind of film: The time is maintained constant (e.g., 30 seconds), and the sizes of the crystals developed at each of the several temperatures of interest are measured. The sizes of the crystals developed by the temperature indicator-recorders are then compared with the calibration crystal sizes. By matching the sizes of the crystals of the temperature indicator-recorders with the calibration standards, the unknown temperatures are determined. Two or more ceramic films of different compositions can be used to record the same temperature. There is thereby obtained a temperature check.

Calibration for service in rocket vehicle re-entry is carried out as follows: The re-entry period is very brief, being actually only a matter of seconds. By use of this known time of re-entry in seconds, the calibration range can typically extend from about 900° C. through ten degrees intervals up to 1400° C. All of the photomicrographs of the crystal sizes must be made at the same magnification so that the sizes of the crystals are comparable one with another.

The manner in which the temperature indicator crystals are formed and grown is believed to be as follows: Nucleation took place at a predetermined temperature in the cupric oxide-enriched porcelain enamel frit film. As the temperature increases, the viscosity of the melt decreases. The viscosity of the melt is a function of temperature, and the size of the crystal grown is a function of viscosity. As the viscosity of the melt decreases, the molecules, atoms, and ions move about more easily, promoting crystal formation. Since small crystals have a greater surface energy than larger crystals, they have a greater tendency to go into solution than larger crystals. The larger crystals therefore grow at the expense of the smaller ones. The crystals grow only in two directions owing to the thinness of the ceramic film, which is less than 0.0001" thick. The shape and size of the crystals formed are easily observed under a microscope. Some crystals appear to be joined together as shown in the figures and some are spaced individually from their neighbors. For best results, it is preferred to compare the size of those crystals that exist individually, with the calibration standards.

The ceramic film temperature indicator-recorder of this invention is especially suitable for space vehicle and nose cone re-entry temperaure measurement and recording because of its low mass and high strength characteristics. However, it can be used equally well in any situation where thermocouple or similar devices are not practical for one reason or another.

It will be understood that the invention of this application can be modified in numerous respects without departure from its essential spirit and it is intended to be limited only by the scope of the appended claims.

What is claimed is:

1. A maximum temperature indicator for temperatures in excess of 900° C. comprising:
   (a) a supporting member of refractory material having a flat, smooth, polished area;
   (b) an organic ceramic film consisting of a solid state solution of porcelain enamel enriched with cupric oxide and having a film thickness of less than .0001 inches;
   (c) said ceramic film being attached as a surface layer to said polished surface area of said supporting member, whereby the maximum temperature reached is indicated by crystal sizes developed in said ceramic film.

2. The temperature indicator set forth in claim 1 wherein said cupric oxide-enriched porcelain enamel frit consists of a mixture containing from approximately 14–30% cupric oxide, 50–86% of a frit porcelain enamel frit having the approximate analysis: 50.4% quartz, 27.4% borax (dehydrated), 9.7% potassium silicofluride, 6.9% soda niter, 4.0% monosodium orthophosphate (dehydrated), and 1.6% sodium silicofluride, and balanced to 100% of a second porcelain enamel frit of the lead-boro-silicate type applicable to aluminum.

References Cited

UNITED STATES PATENTS

| | | | |
|---|---|---|---|
| 1,814,012 | 7/1931 | Taft | 65—33 |
| 2,277,005 | 3/1942 | Ruse | 117—125 XR |
| 2,928,791 | 3/1960 | Laconti | 73—356 XR |

FOREIGN PATENTS 883,287  11/1961  Great Britain.

S. CLEMENT SWISHER, *Acting Primary Examiner.*

D. M. YASICH, *Assistant Examiner.*

U.S. Cl. X.R
65—29, 158

UNITED STATES PATENT OFFICE
CERTIFICATE OF CORRECTION

December 10, 1968

Patent No. 3,415,122

Tin B. Yee

It is certified that error appears in the above identified patent and that said Letters Patent are hereby corrected as shown below:

Column 5, line 9, "organic" should read -- inorganic --.

Signed and sealed this 10th day of March 1970.

(SEAL)
Attest:

Edward M. Fletcher, Jr.
Attesting Officer

WILLIAM E. SCHUYLER, JR.
Commissioner of Patents